US012658013B2

(12) United States Patent
Tsipis et al.

(10) Patent No.: US 12,658,013 B2
(45) Date of Patent: Jun. 16, 2026

(54) CELL PHONE LOSS/THEFT PREVENTION DEVICE ATTACHED VIA A CUT-RESISTANT DISPENSABLE/RETRACTABLE STEEL LINE

(71) Applicants: Arron Tsipis, Palm Beach Gardens, FL (US); Jose Lecaro, Madrid (ES)

(72) Inventors: Arron Tsipis, Palm Beach Gardens, FL (US); Jose Lecaro, Madrid (ES)

(73) Assignee: Clutch Loop CORP, Palm Beach Gardens, FL (US)

( * ) Notice: Subject to any disclaimer, the term of this patent is extended or adjusted under 35 U.S.C. 154(b) by 0 days.

(21) Appl. No.: 18/116,799

(22) Filed: Mar. 2, 2023

(65) Prior Publication Data

US 2025/0029463 A1 Jan. 23, 2025

(51) Int. Cl.
*G08B 13/14* (2006.01)
*H04M 1/04* (2006.01)

(52) U.S. Cl.
CPC .......... *G08B 13/1463* (2013.01); *H04M 1/04* (2013.01)

(58) Field of Classification Search
CPC ... G08B 13/1463; H04M 1/04; H04B 1/3888; A45F 5/004; A45F 5/1516
See application file for complete search history.

(56) References Cited

U.S. PATENT DOCUMENTS

| | | | |
|---|---|---|---|
| 2,783,926 | A | 3/1957 | Wise |
| 5,938,137 | A | 8/1999 | Poulson |
| 6,502,727 | B1 | 1/2003 | Decoteau |
| 6,966,519 | B2 | 11/2005 | Salentine et al. |
| D518,950 | S | 4/2006 | Condiff |

(Continued)

FOREIGN PATENT DOCUMENTS

| | | |
|---|---|---|
| AU | 199941157 B2 | 6/2000 |
| WO | 2019126679 A1 | 6/2019 |

OTHER PUBLICATIONS

Website: https://www.amazon.com/OUTXE-Universal-Stretchy-Compatible-Smartphones/dp/B08JPG7229 Downloaded Apr. 9, 2022 OUTXE Phone Lanyard Tether with 4 Patch—2× Phone Tether.

(Continued)

*Primary Examiner* — Adnan Aziz
(74) *Attorney, Agent, or Firm* — Russ Weinzimmer & Associates, PC

(57) ABSTRACT

A universal cell phone tether that protects a cell phone from theft/loss while permitting easy access to the cell phone. The universal cell phone tether works with all cell phones and all cell phone cases, and is particularly useful at crowded events, like concerts. Included is an anchor element configured to be captured between a cell phone case and a cell phone contained in the cell phone case, while a connection tab extends out from the charger opening of the cell phone case. A spring-loaded line dispenser/retractor enclosed within a dispenser/retractor casing dispenses and retracts a cut-resistant line. The cut-resistant line is terminated by a connection element that engages with the connection tab of the anchor element, the casing also having a second connection tab configured to receive a link element for attachment to a belt loop, a belt, or other robust part of a person's clothing or personal effects.

13 Claims, 9 Drawing Sheets

(56) References Cited

U.S. PATENT DOCUMENTS

| | | | |
|---|---|---|---|
| 7,354,304 B2 * | 4/2008 | Livingston | A45F 5/02 |
| | | | 439/501 |
| 7,661,567 B2 | 2/2010 | Myers | |
| 7,661,620 B2 | 2/2010 | Fields | |
| 7,665,684 B2 | 2/2010 | Salentine et al. | |
| 7,802,746 B2 | 9/2010 | Itu et al. | |
| 8,408,513 B2 | 4/2013 | Smith | |
| 8,714,422 B2 | 5/2014 | Yu | |
| 8,794,560 B2 | 8/2014 | Salentine et al. | |
| 8,854,207 B2 | 10/2014 | Williams | |
| 9,179,762 B2 | 11/2015 | Paugh et al. | |
| 9,496,911 B2 | 11/2016 | Brand | |
| 11,026,502 B1 | 6/2021 | Erold | |
| 11,228,333 B1 * | 1/2022 | Harris | H04B 1/3888 |
| 2003/0042348 A1 | 3/2003 | Salentine et al. | |
| 2005/0072819 A1 * | 4/2005 | Maldonado | A45F 5/021 |
| | | | 224/269 |
| 2007/0212931 A1 | 9/2007 | Livingston | |
| 2007/0278265 A1 | 12/2007 | Contente | |
| 2010/0147041 A1 | 6/2010 | Teicher et al. | |
| 2011/0154618 A1 | 6/2011 | Spero | |
| 2015/0341071 A1 * | 11/2015 | Truchalska | A45F 5/004 |
| | | | 455/575.8 |
| 2017/0359452 A1 * | 12/2017 | Enojado | H04M 1/04 |
| 2018/0069580 A1 | 3/2018 | Harris-Johnson | |
| 2018/0294830 A1 * | 10/2018 | Osmanski | H04M 1/04 |
| 2021/0085064 A1 * | 3/2021 | Khalsa | A45F 5/1533 |
| 2022/0031052 A1 | 2/2022 | Parker | |
| 2023/0104994 A1 * | 4/2023 | Golliher | A45F 5/004 |
| | | | 224/162 |
| 2024/0115033 A1 * | 4/2024 | Kang | A45F 5/004 |

OTHER PUBLICATIONS

Website: https://www.amazon.com/Phone-Assured-Anti-Theft-Anti-Damage-Retractable/dp/B07Y5GZP1T?th=1 Downloaded Apr. 9, 2022 Phone Tether—31" Safety Anti Theft Retractable Phone Clip—Anti-Drop Travel Clip.

Website: https://www.dickssportinggoods.com/p/nite-ize-hitch-phone-anchor-and-lanyard-21nizuhtchphnnchrcac/21nizuhtchphnnchrcac?sku=21789381 Downloaded Apr. 9, 2022 Nite Ize Hitch Phone Anchor and Lanyard.

Website: https://www.keybak.com/products/toolmate-smartphone-jacket-1-lb-rewinding-tool-lanyard-kit-ansi-isea-121-2018-certified Downloaded Apr. 12, 2022 Smartphone Jacket Tool Attachment and Retractable Tool Lanyard Combo The ToolMate Smartphone Jacket and Jacket XL has been designed to fit any cell phone and it's case while tethered to a retractable tool lanyard. The Jacket allows for full function of touch screens, forward/rear facing cameras and fingerprint readers.

YouTube link: https://www.youtube.com/watch?v=JfSKMgtpHlo Downloaded Apr. 14, 2022 Hitch™—Phone Anchor + Tether. The Hitch fits between your phone and case, allowing you to easily tether your phone for security, drop protection, and convenience.

YouTube link: https://www.youtube.com/watch?v=eFCfKyjV6yw Downloaded Apr. 14, 2022 Nite Ize Hitch Cell Phone Anchor EDC Update Nite Ize Hitch Cell Phone Anchor—Keep your Iphone safe on the water.

* cited by examiner

104

106

308

108

CELL PHONE LOSS/THEFT PREVENTION DEVICE ATTACHED VIA A CUT-RESISTANT DISPENSABLE/RETRACTABLE STEEL LINE

FIELD OF THE INVENTION

This invention relates generally to cell phone accessories, and more particularly to cell phone retention devices.

BACKGROUND OF THE INVENTION 70 million cell phones are stolen in the U.S. each year. Professional cell phone thieves are particularly active in large crowded areas, such as concerts, sporting events, festivals, crowded city streets, etc. Most people that attend such crowded events are either unaware of the risk, or just take the risk, relying on unsafe products or cell phone loss insurance which often come with large deductibles.

Some people attempt to reduce the risk by keeping their cell phone in a backpack or in a wearable bag with hidden pockets, such as a fanny pack. Although this approach protects the cell phone from theft, it makes the cell phone inconvenient to use. Thus, while your cell phone is safe, it is not easily usable. For example, one must take off the backpack to access the cell phone, which doesn't allow for quick and easy access to the cell phone during emergencies. Or, one must open the fanny pack and remove the cell phone for use, rendering it vulnerable again to theft or loss.

Other people attempt to reduce the risk of loss or theft of their cell phone by attaching it to their belt or their wrist using a strap, a lanyard, or a wristband, for example. Although some of these things may be aesthetic and provide comfortable convenient access, they are usually made from cheap materials which can break in the event of being yanked or forcefully pulled by someone attempting to steal the cell phone.

SUMMARY OF THE INVENTION

The cell phone retention device of the invention enables a person to reliably retain their cell phone by preventing theft and loss, while also providing comfortable and convenient access to the cell phone.

One embodiment of the cell phone retention device of the invention is a wearable accessory that tethers a cell phone to a person's body or clothing with a secure anchor, a steel retractable cable, and a locking carabiner.

The cell phone retention device of the invention enables a person to safely carry a cell phone in their hand, thereby keeping it ready and accessible for use, without risk of theft or loss. For example, skiers and snowboarders have lost cell phones while on the slopes. Hikers and campers have lost cell phones while hiking up and down mountains. The cell phone retention device of the invention enables a person to carry a cell phone in their hand, and then attend to other matters without risk of losing their cell phone far away from home.

The cell phone retention device of the invention prevents thieves from successfully grabbing a cell phone right out of a person's hand in a crowded environment, such as a concert, a city street, or other crowded urban area.

The invention is the first cell phone anti-theft tether built for music festivals, where professional cell phone thieves are particularly active.

One general aspect of the invention is a cell phone loss/theft prevention device for use with a cell phone and a cell phone case, the cell phone case having a charger opening for permitting the cell phone to be charged while the cell phone is in the case. The device includes an anchor element having a first connection tab, and a first link element attached to the first connection tab, the anchor element configured to be captured between the cell phone case and a cell phone contained in the cell phone case, while the first connection tab and first link element extend out from the charger opening of the cell phone case; and a spring-loaded line dispenser/retractor enclosed within a casing having a guide hole, the line dispenser/retractor configured to dispense and retract a cut-resistant line through the guide hole, the cut-resistant line terminated by a connection element, the casing also having a second connection tab opposite to the guide hole, the second connection tab configured to receive a second link element.

In some embodiments, the device further includes a personal attachment element, attached to the second connection tab, the personal attachment element configured to attach to a portion of an article of clothing or to a wearable accessory.

In some embodiments, the personal attachment element is a metal attaching link with a spring gate.

In some embodiments, wherein the personal attachment element is one of a loop or a strap.

In some embodiments, anchor element is a plastic card that is wider than the charger opening of the cell phone case.

In some embodiments, the anchor element is covered in nylon fabric.

In some embodiments, the anchor element includes an adhesive strip that connects a metal D ring to the anchor element.

In some embodiments, the retractable cut-resistant line is a retractable steel braided cable.

In some embodiments, the retractable cut-resistant line is a retractable steel braided cable covered in a protective enamel.

In some embodiments, the retractable cut-resistant line is a retractable steel line.

In some embodiments, the connection element of the cut-resistant line is a carabiner.

In some embodiments, the connection element of the cut-resistant line is a swivel carabiner.

In some embodiments, the spring-loaded line dispenser/retractor is configured to perform a locking function such that the line could be pulled out slowly, then stop and lock in place, and then be pulled out and released rapidly so as to unlock and retract.

In some embodiments, the second link element is a carabiner with a locking mechanism, the carabiner configured to be received by the second connection tab of the casing of the spring-loaded line dispenser/retractor.

In some embodiments, the second link element is a metal ring, the metal ring configured to be received by the second connection tab of the casing of the spring-loaded line dispenser/retractor.

Another general aspect of the invention is a cell phone loss/theft prevention device for use with a cell phone and a cell phone case, the cell phone case having a charger opening for permitting the cell phone to be charged while the cell phone is in the case. This device includes an anchor element having a first connection tab, the anchor element configured to be captured between the cell phone case and a cell phone contained in the cell phone case, while the first connection tab extends out from the charger opening of the cell phone case; and a spring-loaded line dispenser/retractor enclosed within a casing having a guide hole, the line dispenser/retractor configured to dispense and retract a cut-resistant line through the guide hole, the cut-resistant line terminated by a connection element configured to engage with the first connection tab of the anchor element, the casing also having a second connection tab opposite to the guide hole, the second connection tab configured to receive a link element.

In some embodiments, the link element is a carabiner with a locking mechanism, the carabiner configured to be received by the second connection tab of the casing of the spring-loaded line dispenser/retractor.

In some embodiments, the link element is a metal ring, the metal ring configured to be received by the second connection tab of the casing of the spring-loaded line dispenser/retractor.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1:
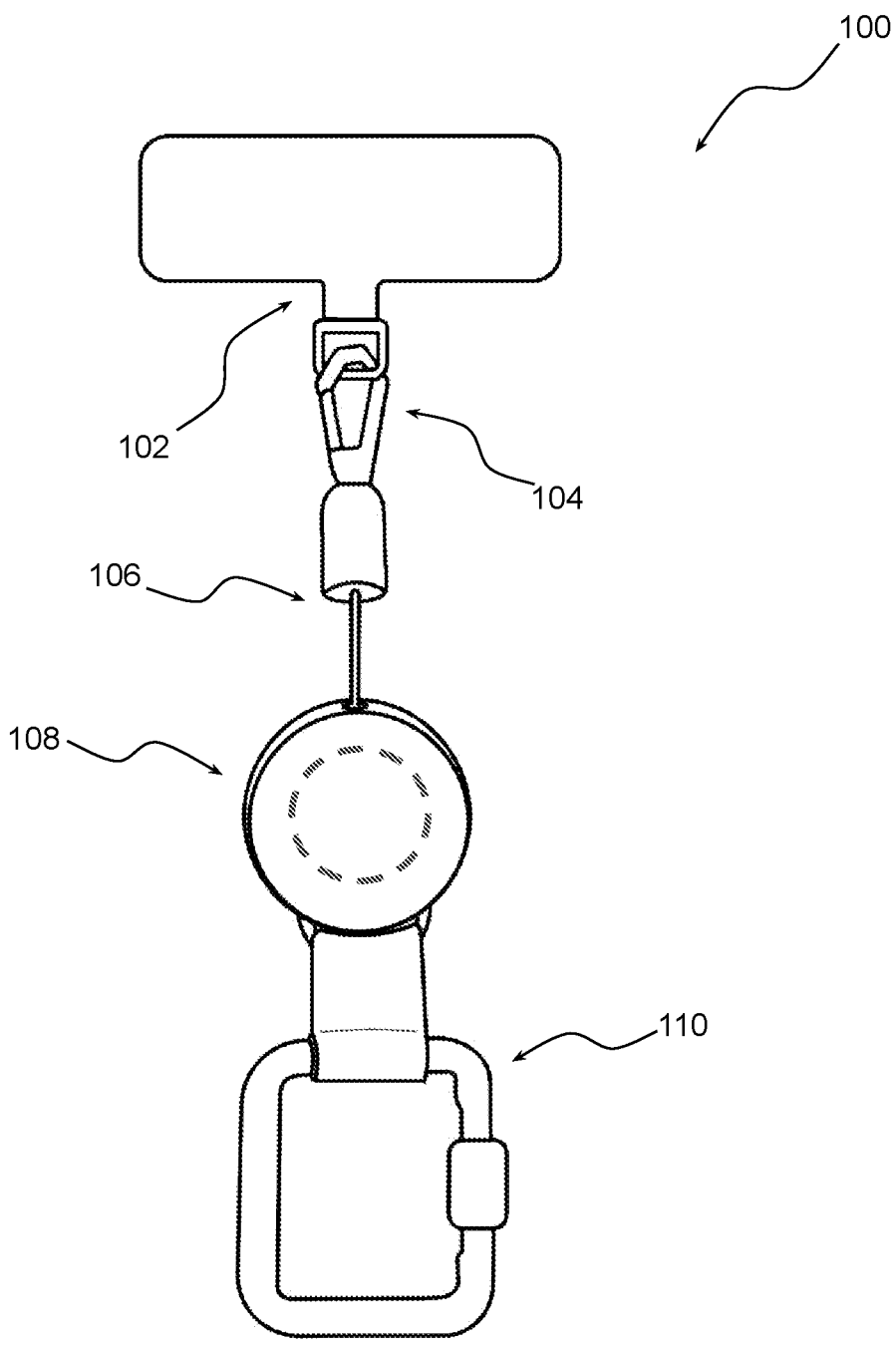
FIG. 1 is a top view of an embodiment of the cell phone retention device of the invention, showing the anchor element, the spring-loaded line dispenser/retractor, and the cut resistant line extending from the spring-loaded line dispenser/retractor to the anchor element, also showing the personal attachment element attached to the spring-loaded line dispenser/retractor before being attached to a belt-loop or other personal accessory.

Referring to FIG. 1, an embodiment 100 of the cell phone retention device of the invention has five main sections: an anchor section 102, a clasp section 104, a cut-resistant line section 106, a casing section 108, and a personal attachment section 110.

Figure 2:
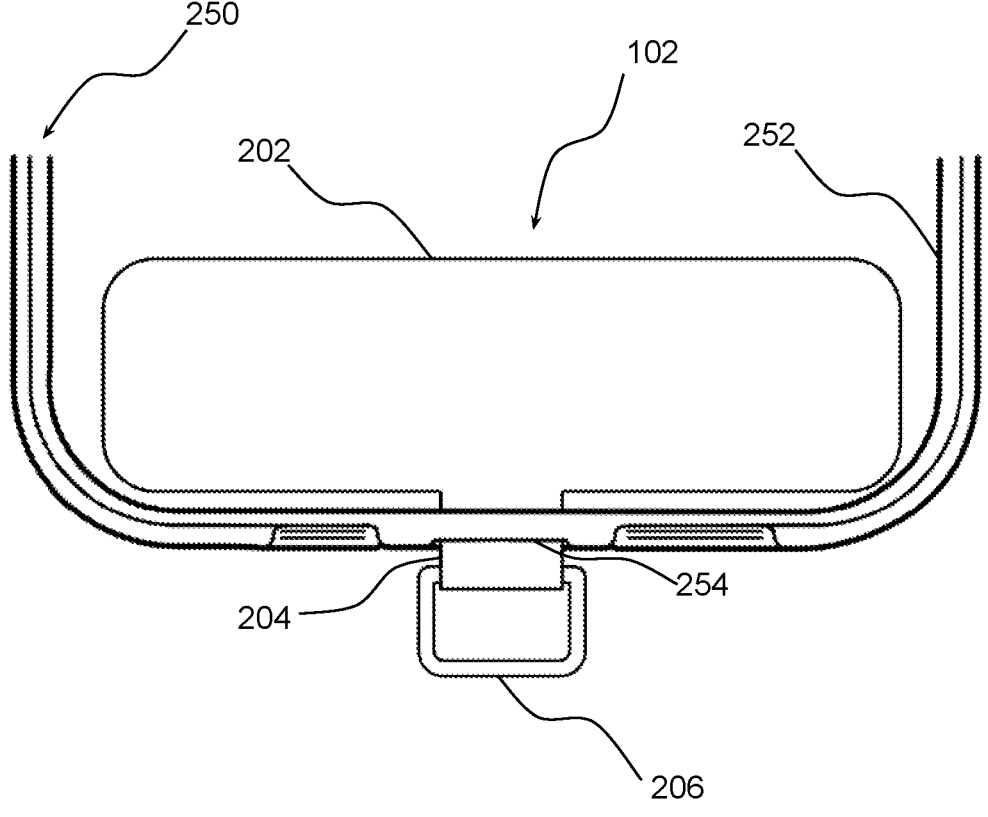
FIG. 2 is a top view of the anchor element of FIG. 1, showing the anchor element inserted in a cell phone case without a cell phone, while the first connection tab extends out from the charger opening of the cell phone case, also showing an optional link element.

With reference to FIG. 2, the anchor section 102 of embodiment 100 has an anchor element 202 and a first connection tab 204 that is narrower than the anchor element 202. The first connection tab 204 is secured to a first link element 206 that is configured to enable attachment of a clasp section 104 (shown in FIG. 1). The anchor element 202 is shown in its working position within the inner boundary 252 of a phone case 250.

This embodiment of the anchor element 202 is shaped as a rounded rectangle so as to provide surface area for the secure capture of the anchor element 202 between a phone (shown in FIG. 6) and phone case 250.

There is also a charging opening 254 on the phone case 250 through which the first tab element 204 and the first link element 206 are sized to fit through. The anchor element 202 is wider than the charging opening 254. The anchor element 202 could be one of a plastic card, a durable composite sleeved in a nylon fabric, a sheet of metal, a pad of vulcanized rubber, for example, and is of a thickness from 0.25 mm to 0.6 mm (420D-210D thickness), such that the anchor element resting between the phone (shown in FIG. 6) and the phone case 250 could be captured by the phone case. The rigidity (stiffness) of the anchor element 202 is sufficient to prevent pulling of the anchor element 202 from the phone case 250 through the charger opening 254.

While the first link element 206 can be made of a different material than the connection tab 204, materials for first connection tab 204 and first link element 206 can be any which could reliably overcome the forces associated with phones being snatched, such as: rigid materials such as metal, a durable composite, or a durable plastic; flexible materials such as woven nylon, reinforced fabric, and treated leather, for example.

Figure 3:
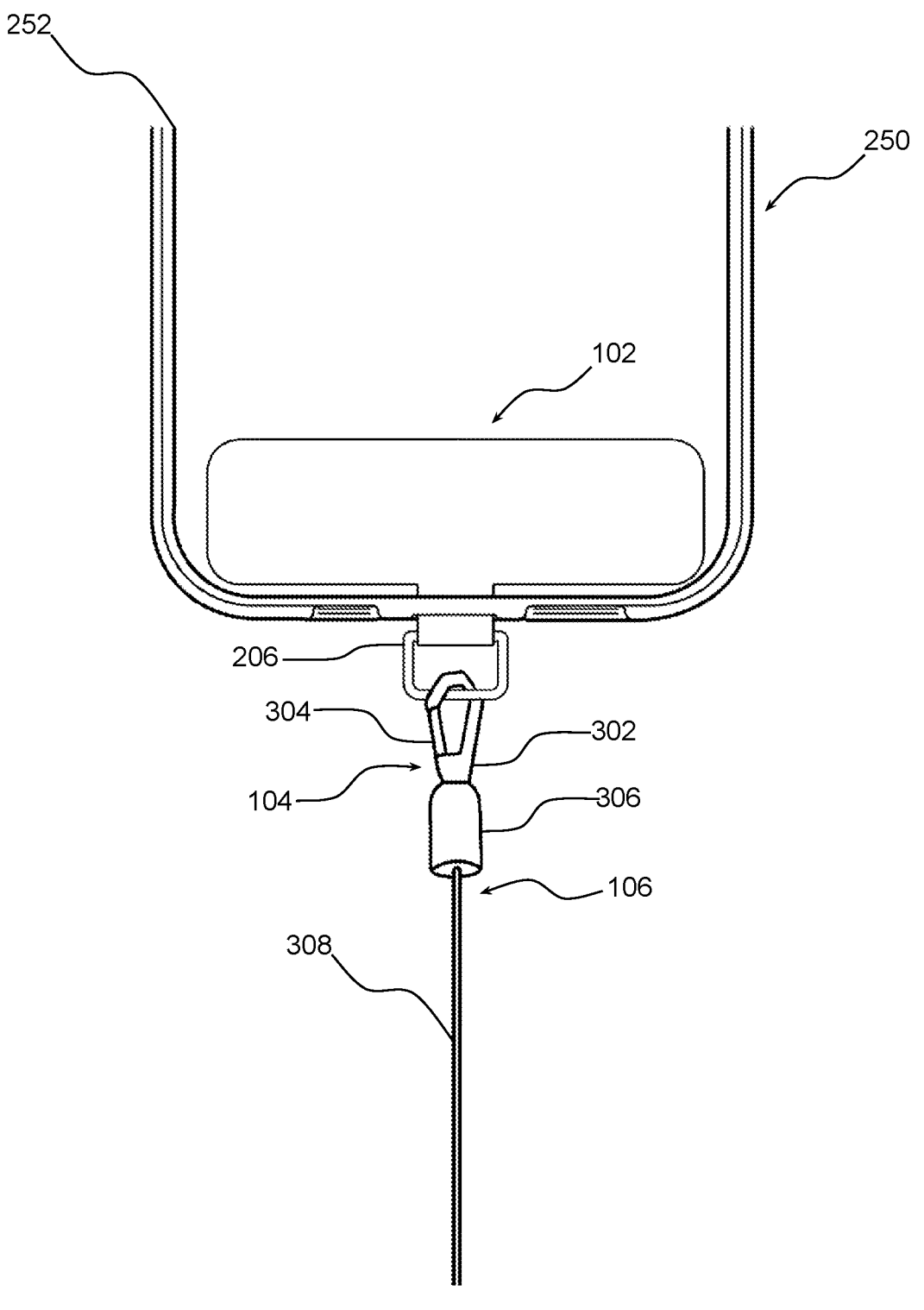
FIG. 3 is a top view of the anchor element of FIG. 1 inserted in the cell phone case of FIG. 2, also showing the connection element secured at the end of the cut-resistant line, the connection element attached to the link element of FIG. 2.

Referring to FIG. 3, the anchor section 102 of FIG. 2 is shown attached to the clasp section 104 and cut-resistant line section 106. The first link element 206 of the anchor section 102 is shown as a rectangular link (but could also be a punched hole with a circular ring, for example), which enables connection of the clasp section 104, here including a swivel hook 302 with a spring gate 304.

This embodiment of the swivel hook 302 and the swing gate 304 is also one choice of many alternatives, such as screw lock carabiners and key rings by which the anchor section 102 can form a secure attachment to the cut-resistant line section 106. Here, the secure attachment of clasp section 104 to cut-resistant line section 106 is enabled by a terminal housing 306 which captures a knot at the end of the cut-resistant line 308, and a ball on the bottom of the swivel hook 302 within an inner cavity from which the respective openings are too narrow for both to be pulled free. The embodiment of the terminal housing 306 is one of many alternative embodiments that can perform the same function, but exhibit a different appearance. An important property for all components continues to be integrity and robustness, and material choices so far unmentioned can be any that would form a secure connection, such as: metals, durable composites, and durable plastics, for example.

Figures 4A, 4B:
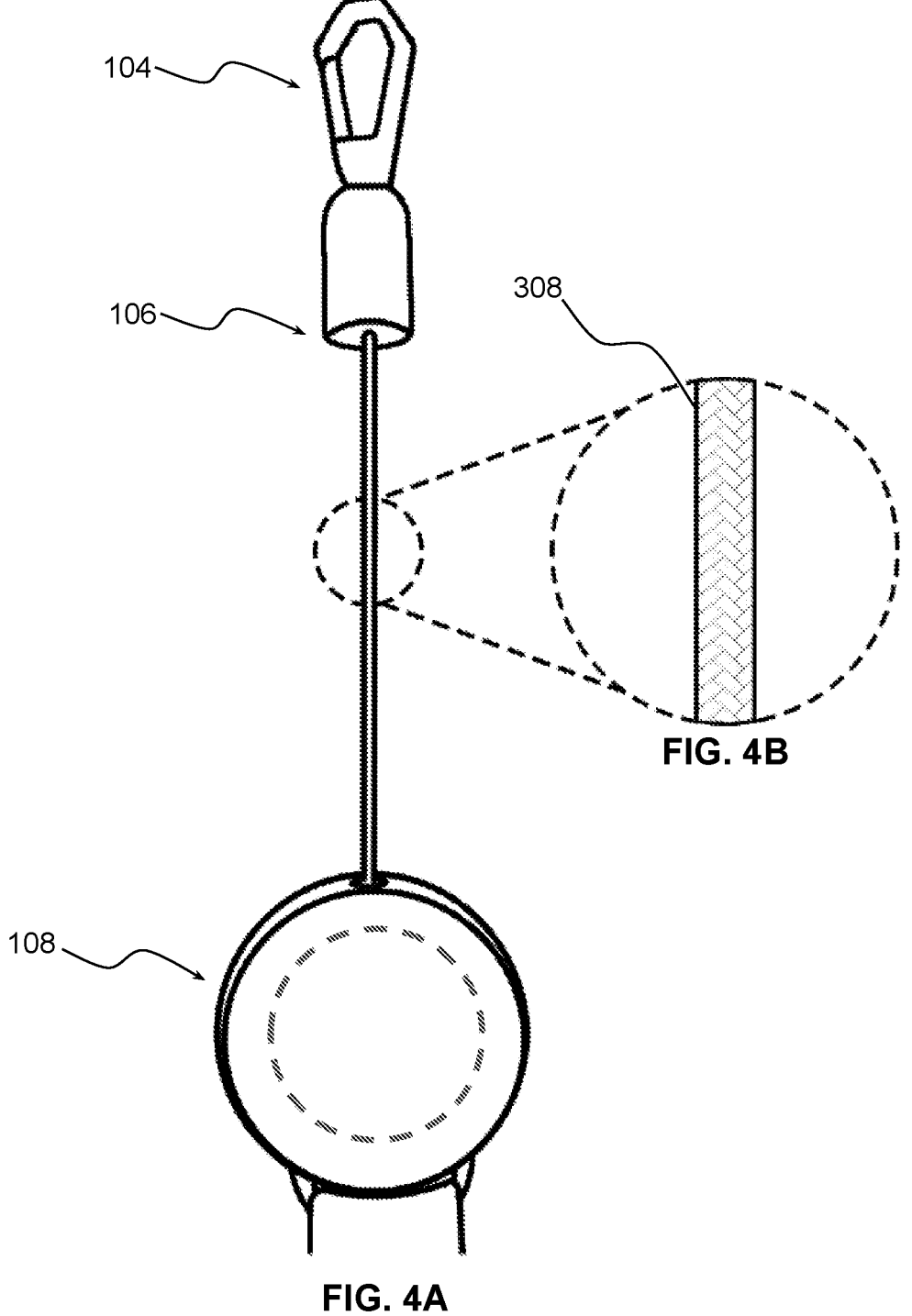
FIG. 4A is a partially enlarged top view of the cut-resistant line, also showing the connection element secured at the end of the cut-resistant line, and the spring-loaded line dispenser/retractor that has dispensed some of the cut-resistant line.
FIG. 4B is an enlarged view of the cut-resistant line of FIG. 4A.

With reference to FIG. 4A, the clasp section 104, cut-resistant line section 106, and the case section 108 of FIG. 1 are shown. FIG. 4B is an enlarged view of the cut resistant line 308 of the cut-resistant line section 106, showing that the cut-resistant line 308 is actually made of braided steel. Other cut-resistant lines made from solid metal wire, durable composite wire, or chained or braided lines made from durable material, or a line that has been made more cut-resistant by another process, would also be suitable.

Figure 5:
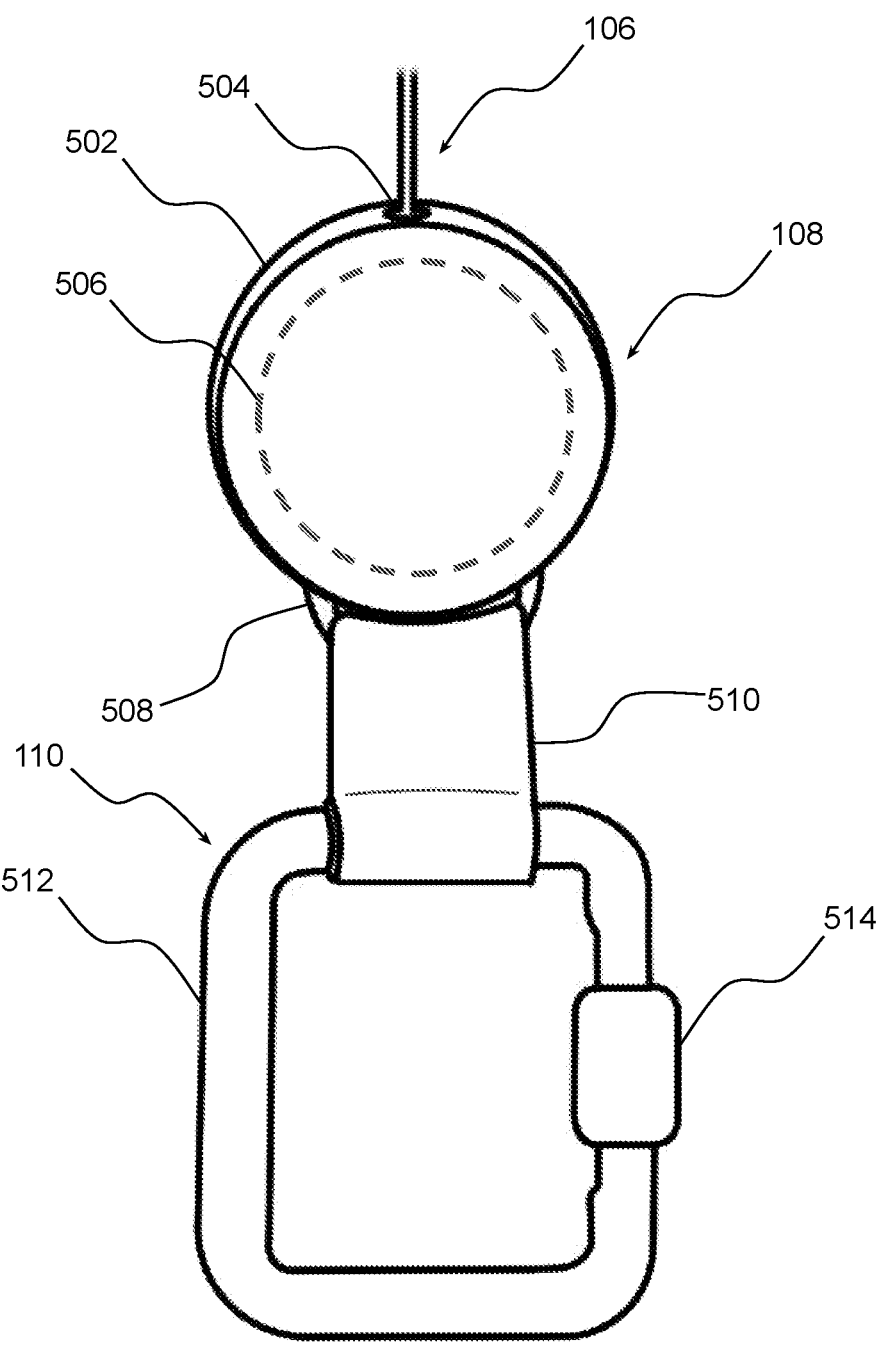
FIG. 5 is a close-up top view of the spring-loaded line dispenser/retractor of FIG. 4A, showing the casing having a guide hole, and a second connection tab opposite to the guide hole.

Referring to FIG. 5, the cut-resistant line section 106, case section 108, and personal attachment section 110 of FIG. 1 are shown. Components of the case section 108 include a case 502, a guide hole 504 through which the cut-resistant line 308 moves through, an enclosed spring-loaded dispenser/retractor 506, and a lob 508 for affixing a second connection tab 510.

The case 502 is shown to have a well-defined shape as to indicate that plastic, metal, a composite, or another rigid material can be used to enclose the spring-loaded line dispenser/retractor, the properties and manufacture of which will be apparent to one skilled in the art of manufacturing similar products, such as leashes or systems that require tension on, or retraction of, cables.

While a rigid shape is shown for the case 502, more flexible materials like leather or durable fabric can be used as well. As the case 502 is made of a rigid material, the lob 508, in this embodiment seamlessly attached to the case 502, is made of the same material and, in this embodiment, as opposed to the many other possible embodiments of structures that can affix a tab to a case, has a structure resembling a traditional wrist watch lob which attaches the case of a watch to its bands.

A second connection tab 510 attached to a lob must also ensure the security of the device, and can be made of any material that can reliably withstand forces associated with snatching an object, such as: metal, leather, and durable fabric.

FIG. 5 also shows the personal attachment section 110 to be that of a carabiner 512 with a locking mechanism 514. While the locking mechanism 514 does add to the security provided by the present invention, other possibilities such as regular spring gate carabiners, metal rings, loops of braided nylon, straps of canvas, attachment devices of durable plastic, or other such attachment devices of a material suitable to resist breaking during an attempted theft of an attached phone (shown in FIG. 6) can be used.

Figure 6:
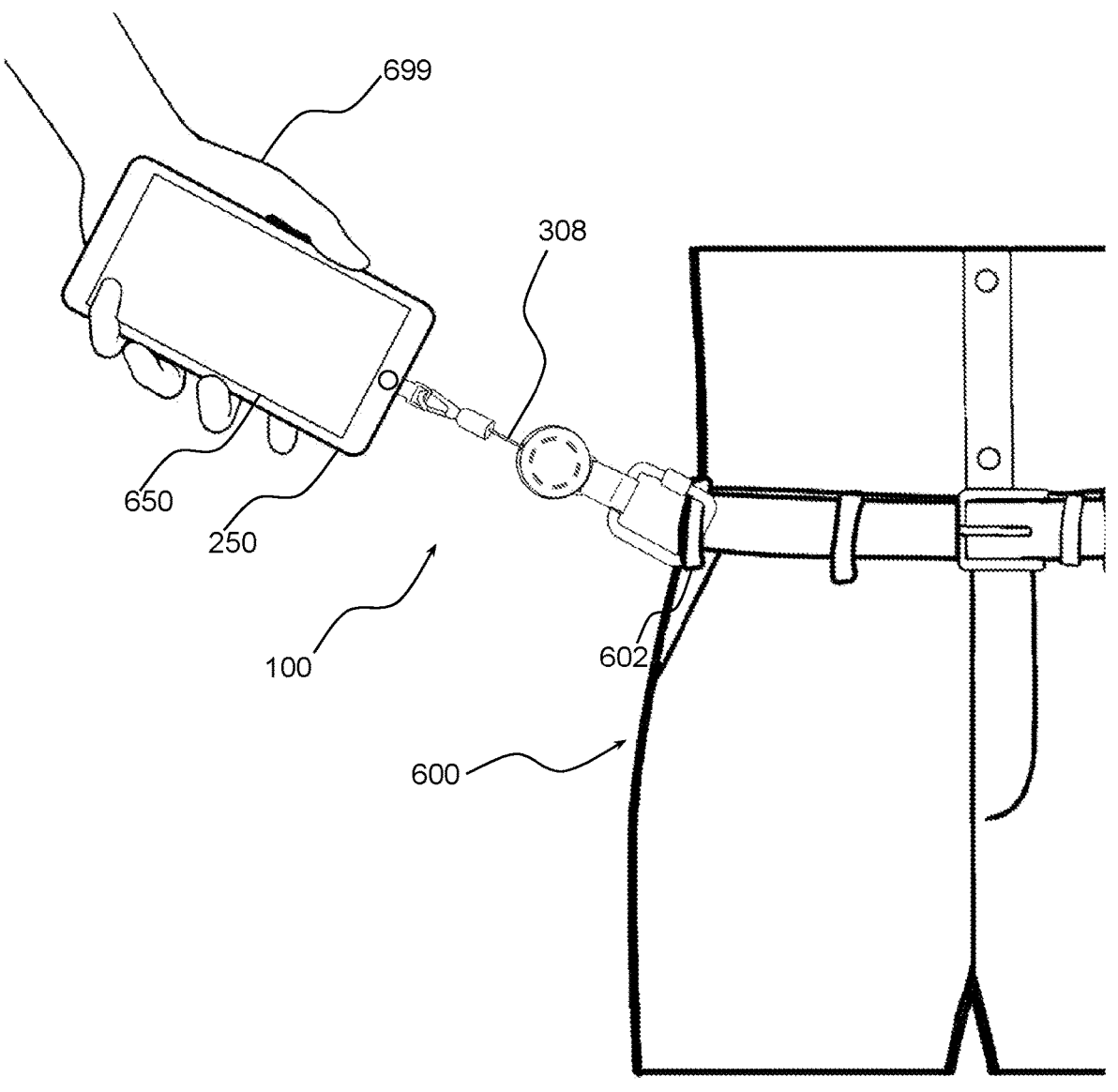
FIG. 6 is a front view of a cell phone secured by the embodiment of FIG. 1, attached by a standard carabiner to a belt loop of pants worn by a person, showing a thief attempting to grab and run with the cell phone.

With reference to FIG. 6, the embodiment 100 of FIG. 1 is shown attached to a belt loop 602 of a user 600, with the anchor element 202 (shown in FIG. 2) properly captured between the phone 650 and the phone case 250. A secondary hand 699 not belonging to the user (e.g., a thief) is shown pulling the phone away from the user, but nevertheless remaining tethered to the user due to the tethering action of the embodiment 100 of the invention. This tethering action will provide tactile and auditory feedback that will alert the user to the incipient theft, as well as the embodiment 100 of the invention enforcing a maximum distance that the attached phone 650 can be removed from its attached user 600, since the cut-resistant line 308 will be extended to its maximum limit.

Figure 7:
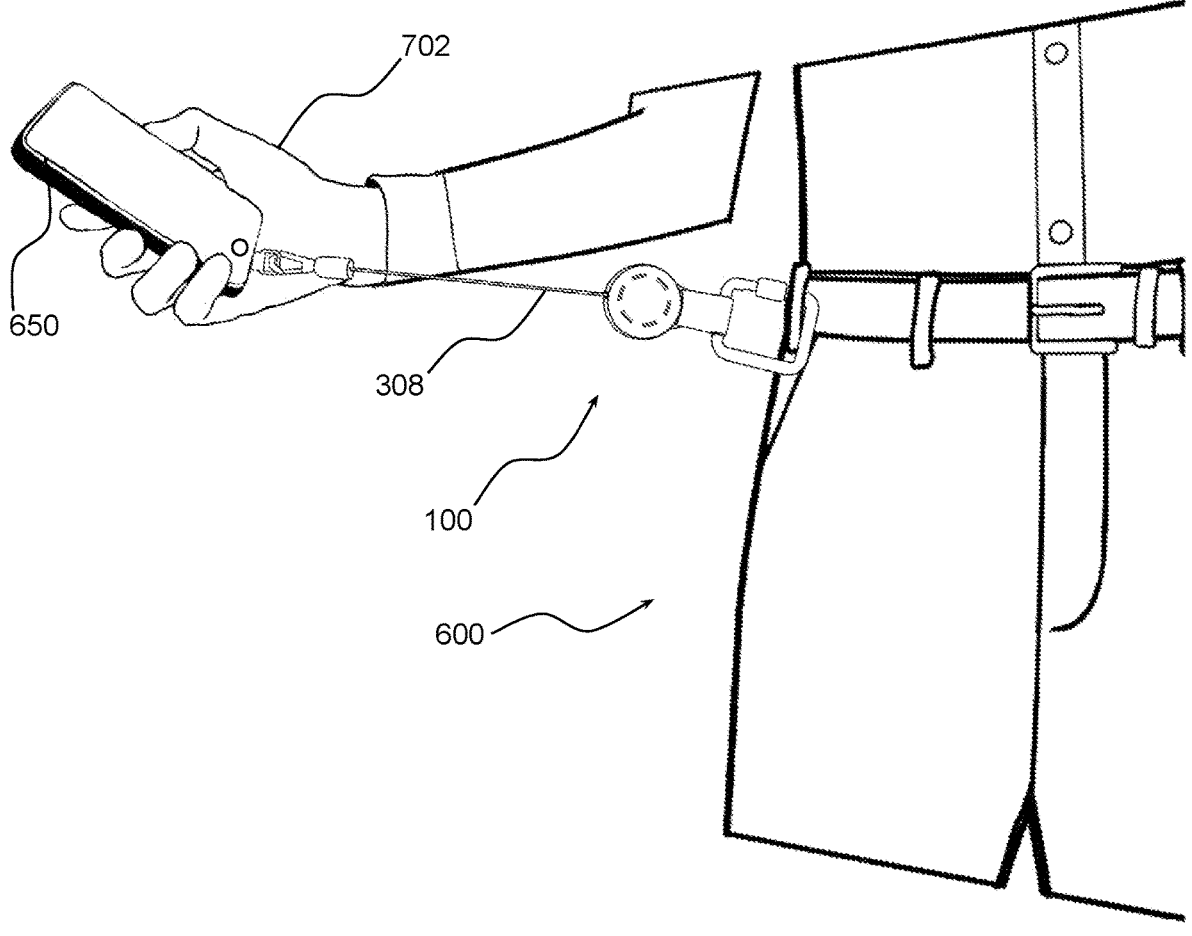
FIG. 7 is a front view of a cell phone secured by the embodiment of FIG. 1, attached by a standard carabiner to a belt loop of pants worn by a person, showing the person using their cell phone by pulling the cell phone along with the attached cut resistant line out and away from the spring-loaded line dispenser/retractor.

Referring to FIG. 7, the embodiment 100 of FIG. 1 is shown attached to a user 600 as it was in FIG. 7, this time the hand 702 of the user 600 gripping the phone 650. FIG. 7 demonstrates that the phone 650 can still be used in an easy, one-handed manner within the limit of full extension of the line 308, without the detaching the cut resistant line 308, and without giving up the security afforded by the embodiment 100.

Figure 8:
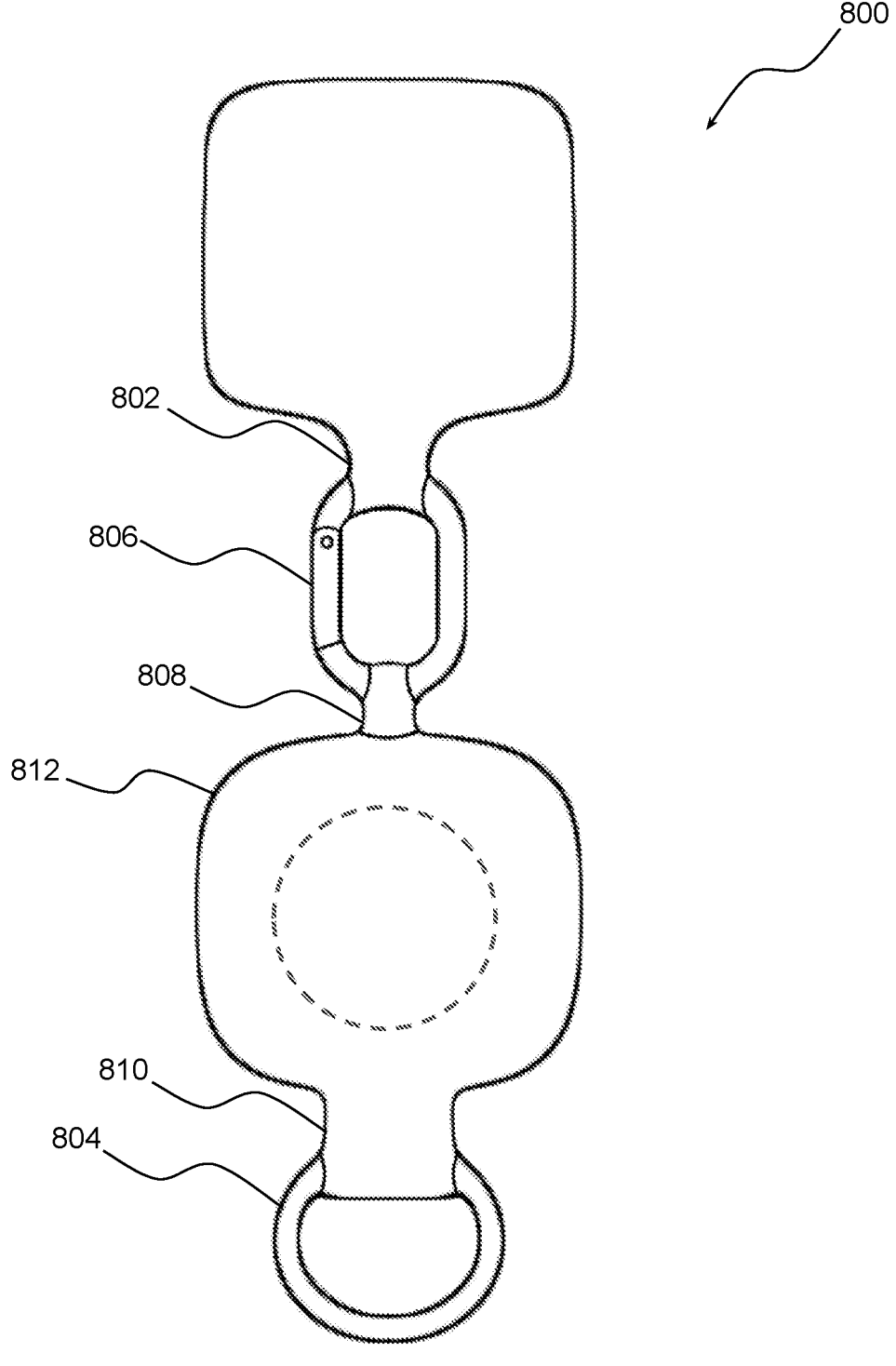
FIG. 8 is a second embodiment of the cell phone retention device of the invention.

With reference to FIG. 8, a different embodiment 800 of the present invention is distinguished by a first connection tab 802 that is also a first link element, as well as a second link element 804, instead of an element for attaching the invention directly to one's person. Here the second link element 804 is that of a metal D-ring, while other suitable choices of material, such as composites and plastics, and other suitable shapes, such as rings and rectangles, are possible so long as they do not undermine the security of the present invention and allow an area for the invention to attach, passively or actively, to another object. Other features of this embodiment 800 include: the use of a spring-gate carabiner 806 on a swiveless terminus housing 808, a second connection tab 810 natively attached to a case 812, and a shaping of the case 812 that suggests either: a soft shell design for the case 812 of fabric, silicone, or a similar material; or a clam shell design for the case 812 of a less malleable material, such as composites or hard plastics.

Figure 9:
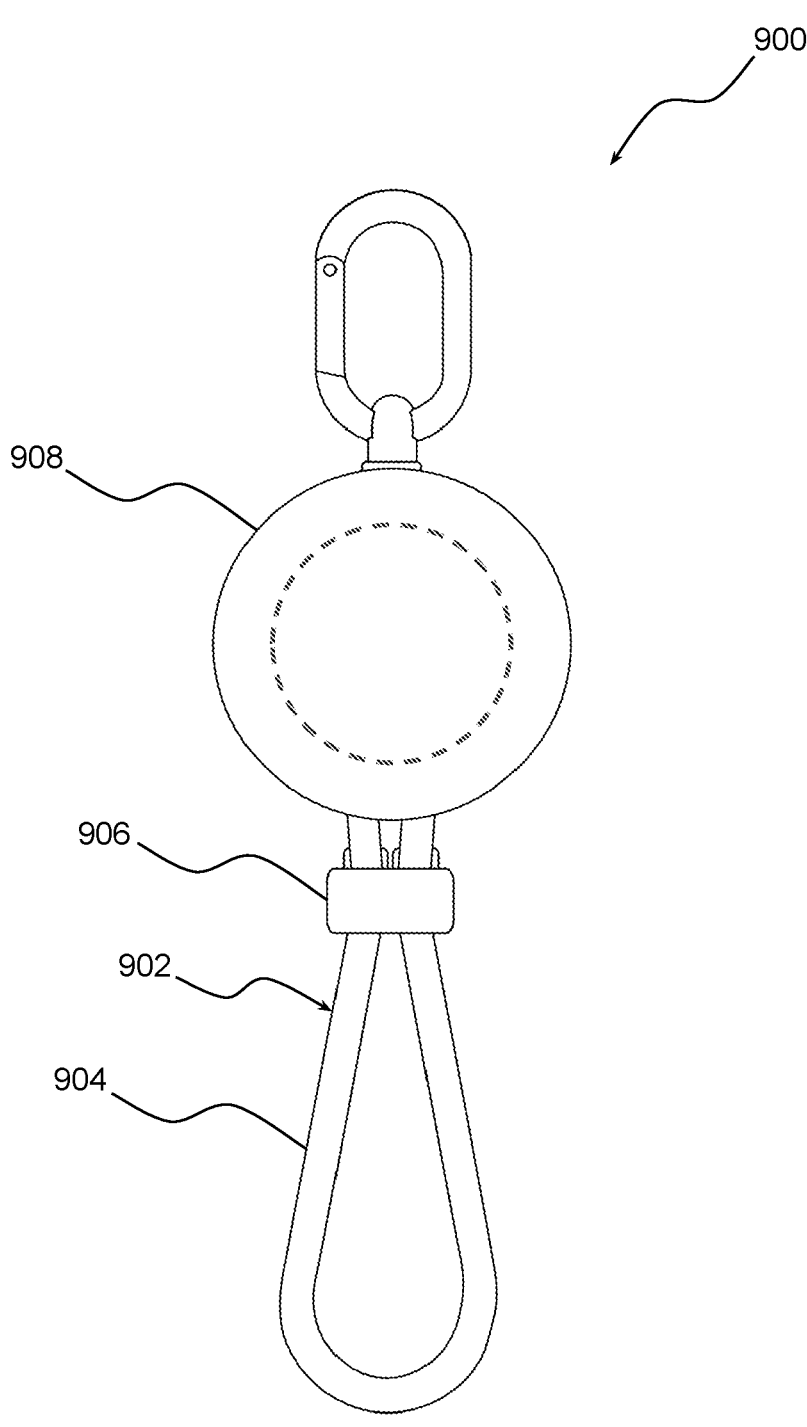
FIG. 9 is a third embodiment of the cell phone retention device of the invention.

Referring to FIG. 9, a different embodiment 900 of the present invention is shown. This embodiment 900 differs from the embodiments of FIG. 8 and FIG. 1 in the choice of a personal attachment element 902 of a strap 904 with a slide 906 for tightening the strap 904 as to secure the strap 904 to one's person on an area such as a wrist or belt loop. Another difference is that the personal attachment element 902 is natively attached to the case 908, such that the geometry of the case captures the strap 904 without the need for additional fixtures or outcroppings to couple the two components.

How to Use the Device

1. Place the anchor 202 inside the cell phone case 250 while at least the first connection tab 204 extends out from the charger opening 254 of the cell phone case 250.
2. Clip the locking carabiner 512 at the end of the retractable line 308 to the extension tab 204/206 of the anchor 102.
3. Clip the locking carabiner 512 to your belt loop 602, belt, clothing outfit, backpack, or to a festival wristband on one's wrist.

Other modifications and implementations will occur to those skilled in the art without departing from the spirit and the scope of the invention as claimed. Accordingly, the above description is not intended to limit the invention, except as indicated in the following claims.

What is claimed is:

1. A cell phone loss/theft prevention device for use with a cell phone and a cell phone case, the cell phone case having a charger opening for permitting the cell phone to be charged while the cell phone is in the case, the device comprising:

an anchor element having a first connection tab, and a first link element attached to the first connection tab, the anchor element configured to be captured between the cell phone case and a cell phone contained in the cell phone case, while the first connection tab and first link element extend out from the charger opening of the cell phone case; and a spring-loaded line dispenser/retractor enclosed within a casing having a guide hole, the line dispenser/retractor configured to dispense and retract through the guide hole a cut-resistant line that is a retractable steel braided cable, the cut-resistant line terminated by a connection element, the casing also having a second connection tab opposite to the guide hole, the second connection tab configured to receive a second link element.

2. The cell phone loss/theft prevention device of claim 1, further comprising:

a personal attachment element, attached to the second connection tab, the personal attachment element configured to attach to a portion of an article of clothing or to a wearable accessory.

3. The cell phone loss/theft prevention device of claim 2, wherein the personal attachment element is a metal attaching link with a spring gate.

4. The cell phone loss/theft prevention device of claim 2, wherein the personal attachment element is one of a loop or a strap.

5. The cell phone loss/theft prevention device of claim 1, wherein the anchor element is a plastic card that is wider than the charger opening of the cell phone case.

6. The cell phone loss/theft prevention device of claim 1, wherein the anchor element is covered in nylon fabric.

7. The cell phone loss/theft prevention device of claim 1, wherein the anchor element includes an adhesive strip that connects a metal D ring to the anchor element.

8. The cell phone loss/theft prevention device of claim 1, wherein the retractable cut-resistant line is a retractable steel braided cable covered in a protective enamel.

9. The cell phone loss/theft prevention device of claim 1, wherein the connection element of the cut-resistant line is a carabiner.

10. The cell phone loss/theft prevention device of claim 1, wherein the connection element of the cut-resistant line is a swivel carabiner.

11. The cell phone loss/theft prevention device of claim 1, wherein the spring-loaded line dispenser/retractor is configured to perform a locking function such that the line could be pulled out slowly, then stop and lock in place, and then be pulled out and released rapidly so as to unlock and retract.

12. The cell phone loss/theft prevention device of claim 1, wherein the second link element is a carabiner with a locking mechanism, the carabiner configured to be received by the second connection tab of the casing of the spring-loaded line dispenser/retractor.

13. The cell phone loss/theft prevention device of claim 1, wherein the second link element is a metal ring, the metal ring configured to be received by the second connection tab of the casing of the spring-loaded line dispenser/retractor.

* * * * *